E. D. DAVIS.
POULTRY CAR.
APPLICATION FILED NOV. 19, 1913.
1,099,119.
Patented June 2, 1914.
2 SHEETS—SHEET 1.
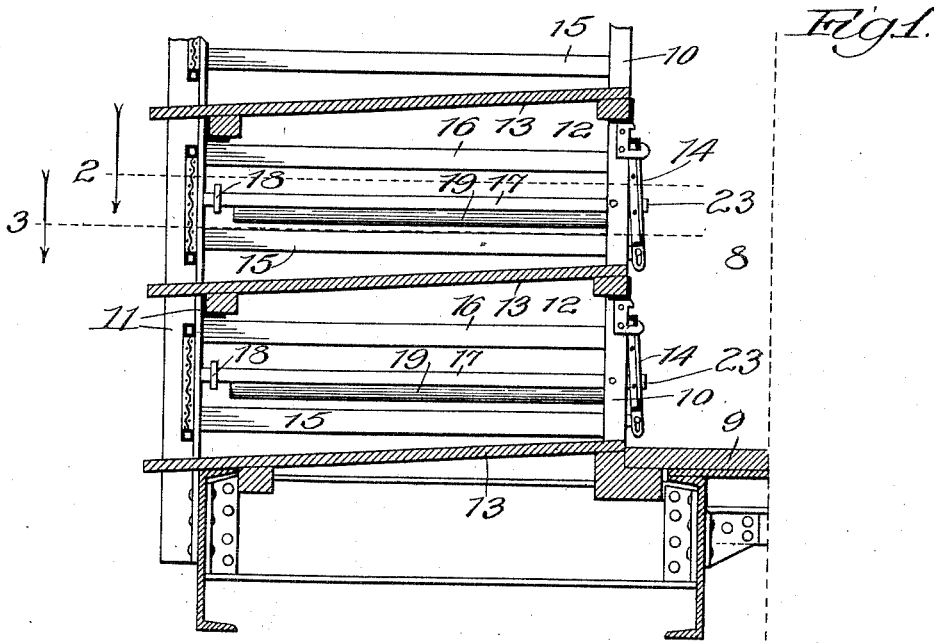
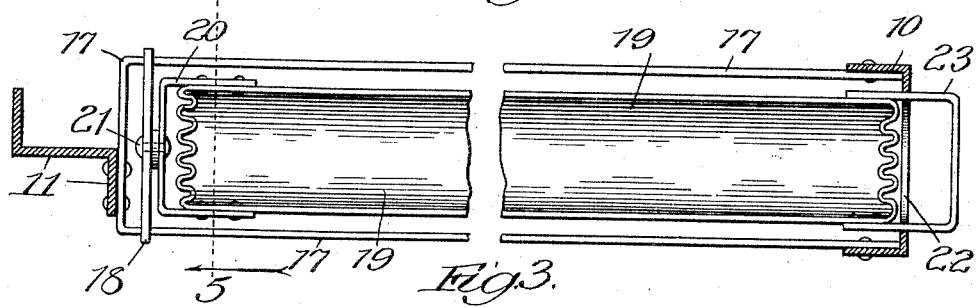
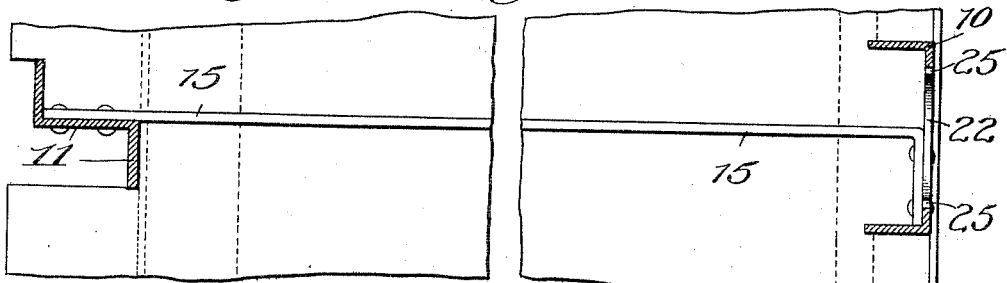
Witnesses:
Inventor:
Elnino D. Davis,
By Dyrenforth, Lee, Chritton & Wiles
Attys.

E. D. DAVIS.
POULTRY CAR.
APPLICATION FILED NOV. 19, 1913.
1,099,119.
Patented June 2, 1914.
2 SHEETS—SHEET 2.
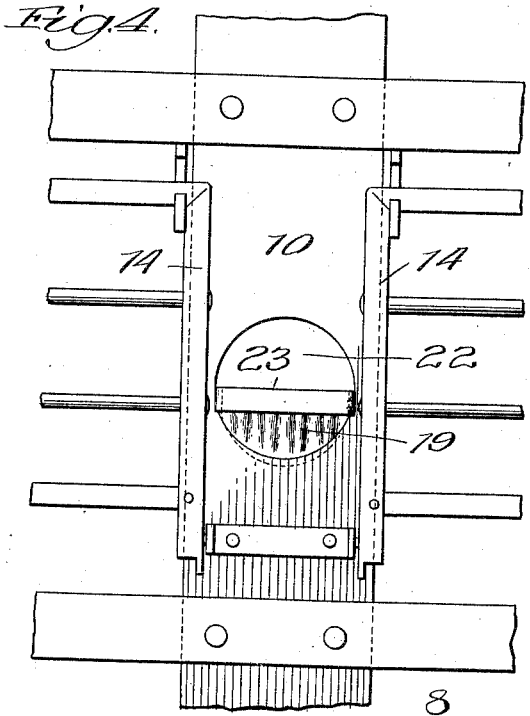
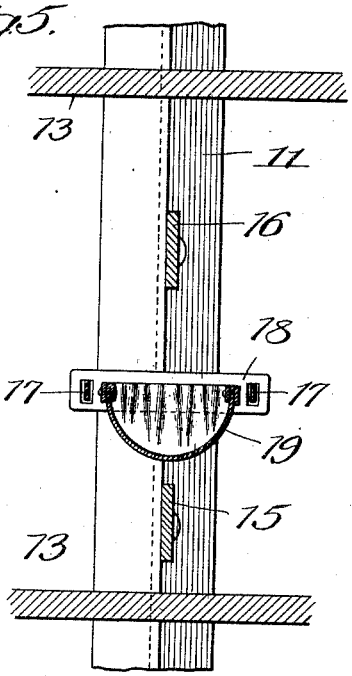
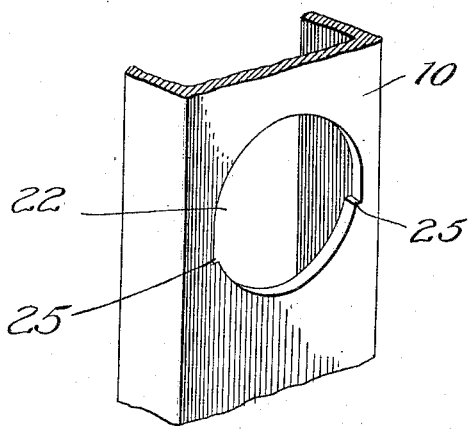
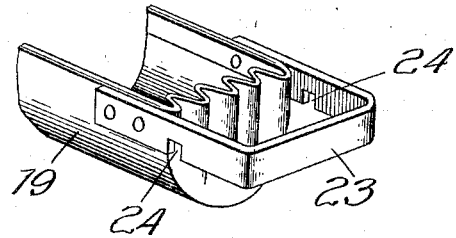

UNITED STATES PATENT OFFICE.

ELNINO D. DAVIS, OF CHICAGO, ILLINOIS, ASSIGNOR TO FRANCIS X. MUDD, OF CHICAGO, ILLINOIS.

POULTRY-CAR.

1,099,119. Specification of Letters Patent. Patented June 2, 1914.

Application filed November 19, 1913. Serial No. 801,765.

*To all whom it may concern:*

Be it known that I, ELNINO D. DAVIS, a citizen of the United States, residing at Chicago, in the county of Cook and State of Illinois, have invented a new and useful Improvement in Poultry-Cars, of which the following is a specification.

My invention relates particularly to the feed-trough feature of a car for shipping live poultry. This type of car is equipped for its purpose with tiers of coops on opposite sides of a central aisle at which they are accessible through doors. The troughs are commonly located between horizontally successive coops to enable the fowl therein to use the intermediate troughs which are axially supported in a manner to adapt them to be withdrawn longitudinally into the aisle and turned on their axes for emptying them of their contents. The space occupied by each trough in the interstitial wall or partition between successive coops is barricaded by opposite bars or rods to prevent the poultry from passing from one coop to another, when a trough is withdrawn, and from entering or roosting over a feed-trough when it is in place.

The primary object of my improvement is to simplify the means employed for guiding the axially-turning trough in withdrawing it from and restoring it to its normal position, by employing the two barricading bars, referred to, as the guiding medium and support for the rear end of the trough, whereby the movements of the latter are rendered steady and smooth.

A further object is to employ the handle, provided on the inner or aisle end of the trough for manipulating it, as a locking medium against accidental capsizing of the trough in its normal position.

In the accompanying drawings, Figure 1 is a broken view in vertical sectional elevation showing enough of a poultry-car to illustrate the trough-equipped coops, to which my improvements are applied; Fig. 2 is an enlarged broken plan section on line 2, Fig. 1; Fig. 3 is an enlarged broken section on line 3, Fig. 1, showing the manner of fastening at its ends each lower partition-bar of a coop; Fig. 4 is an enlarged broken view showing two horizontally adjacent coops, at the aisle, in elevation, with an aisle-post between them and containing an opening, in which a trough is supported at its handle; Fig. 5 is an enlarged section on line 5, Fig. 2; Fig. 6 is a broken view in perspective of an aisle-post showing the circular shouldered opening therein through which to withdraw a trough into the aisle and restore it to its operative position, wherein notches in the handle embrace the shoulders to support the forward end of the trough and lock the latter against capsizing, and Fig. 7 is a broken perspective view showing the handle-equipped end of a trough.

The construction of the poultry-car 8, as a whole, presents no features of novelty and requires no detailed description, it being well-known in the art. At each side of the aisle is a row of vertical posts 10, of the preferred channel-beam form illustrated; and alining with each, in the outer walls of the car, is a metal post 11 of Z-shape in cross-section. The coops 12, the floors (roofs) 13 of which are shown to incline downwardly toward the outer sides of the car, are built in rows of tiers between successive posts 10 and 11, and doors 14, formed of spaced bars, are hinged at their lower ends to the posts 10 to open downwardly into the aisle. Each side-partition of a coop is shown to be formed of a lower bar 15 (Fig. 3) riveted at its outer end to the intermediate web of a post 11, and bent at its aisle-end to register with the inner face of a post 10, to which it is riveted, and an upper bar 16, which is similarly fastened at its ends to opposite posts 10 and 11. Between pairs 15, 16 of these partition-bars extend rigid rectangular frames 17, each being riveted at its outer end to a web of a post 11 (Fig. 2) and at its inner end to the sides of a channel-beam 10, the side-bars of each frame affording rails extending parallel and in alinement with adjacent bars 15 and 16. On the rails of each frame 17 is mounted, to slide back and forth thereon, a cross-head 18, the cross-head containing end-openings which fit about these rails and adapt it to be moved back and forth easily and steadily thereon. Troughs 19, which are preferably formed of sheet-metal and each out of one piece of metal, have bails 20 riveted to their inner ends, at which they are centrally pivoted, as shown at 21 in Fig. 2, to the cross-heads, to adapt the troughs to be turned axially. Circular holes 22 are provided at intervals in each aisle-post 10 to register with the forward ends of troughs, each of which has riveted to its opposite sides a bail-shaped handle 23 having notches 24 in its opposite sides to seat over diametrically-opposite shoulders 25 in the respective hole 22.

In the normally retracted position of a trough, it abuts at its forward end against the face of a post below an opening 22 therein, being brought to that position by the handle dropping to engage its notches with the shoulders 25, whereby the trough is locked stably in that position against accidental displacement, as, by the jolting of the car in motion. To withdraw a trough into the aisle, as for emptying and replenishing it, the handle must be first raised to free it from the shoulders 25 and lift the front end into registration with the post-opening 22. The trough may then be easily withdrawn into the aisle, and subsequently pushed back into place, without wabbling or binding, because the sliding of the rigid cross-head on the rails of the rigid frame 17 causes the trough to move with piston-like steadiness, directness and smoothness. A further advantage of my improved construction consists in utilizing the frame 17 for the two-fold purpose of affording sections of the coop sides or partitions and rails for carrying the troughs.

The employment of the frame 17 as rails for carrying the trough affords two lineal supports for the trough and prevents angular displacement of the cross head and resulting binding in the somewhat rough handling to which these devices are sometimes subjected by the poultry-handlers in the car, thereby avoiding all sticking of the trough and the spilling of its contents in the effort to loosen it and straighten it on its guides.

What I claim as new and desire to secure by Letters Patent is—

1. In a poultry-car having coops arranged side by side and posts at intervals at their inner ends, provided with openings, rigid parallel rails extending in pairs outwardly from said posts, cross-heads each connecting and movable upon a pair of said rails, and troughs each pivotally connected at its outer end with a cross-head to be moved back and forth through one of said openings.

2. In a poultry-car having coops arranged side by side and posts at intervals at their inner ends, provided with openings, rigid parallel barricading bars forming rails in pairs at opposite sides of the coop-partitions, cross-heads each connecting and movable upon a pair of said rails, and troughs each pivotally connected at its outer end with a cross-head to be moved back and forth through one of said openings.

3. In a poultry-car having coops arranged side by side and posts at intervals at their inner ends, provided with openings, and at their outer ends, rigid rectangular frames fastened at their opposite ends to the outer and inner posts to extend their side-members as barricading bars forming rails along opposite sides of the coop-partitions, cross-heads each connecting and movable upon a pair of said rails, and troughs each pivotally connected at its outer end with a cross-head to be moved back and forth through one of said openings.

4. In a poultry-car having coops arranged side by side, channel-beam posts at intervals at the inner coop-ends, provided with openings, and Z-shaped posts at the outer coop-ends, partitions for the coops formed with upper and lower bars secured at their ends to opposite alining posts, and rigid rectangular frames fastened at their opposite ends to said posts to extend their side-members between said upper and lower bars as barricading bars forming rails, cross-heads each conecting and movable upon a pair of said rails, and troughs each pivotally connected at its outer end with a cross-head to be moved back and forth through one of said openings.

5. In a poultry-car having coops arranged side by side and posts at intervals at their inner ends, openings in the posts, troughs pivotally supported in the coop-sides to be moved back and forth through said openings, handles projecting from the inner ends of the troughs, and interlocking means for engaging the handles with the post openings, in the normal position of the troughs, to prevent turning thereof on their pivots.

6. In a poultry-car having coops arranged side by side and posts at intervals at their inner ends, openings in the posts, troughs pivotally supported in the coop-sides to be moved back and forth through said openings, and handles projecting from the inner trough-ends and provided with notches to engage the posts at said openings, when the troughs are in normal position, to prevent turning thereof on their pivots.

7. In a poultry-car having coops arranged side by side and posts at intervals at their inner ends, openings in the posts provided with diametrically-opposite shoulders, troughs pivotally supported in the coop-sides to be moved back and forth through said openings, and bail-like handles projecting from the inner trough-ends and provided with notches in the lower edges of their opposite sides to engage the shoulders in said openings when the troughs are in normal position, for the purpose set forth.

ELNINO D. DAVIS.

In presence of—
L. HEISLAR,
A. J. FLOYD.